United States Patent [19]
Dahl

[11] Patent Number: 5,655,734
[45] Date of Patent: Aug. 12, 1997

[54] GALLEY DOLLY

[76] Inventor: Deborah L. Dahl, 3756 Fir St., Greenbank, Wash. 98253

[21] Appl. No.: 490,309

[22] Filed: Jun. 14, 1995

[51] Int. Cl.$^6$ .................. B64D 9/00; B62B 1/12; B65G 67/02
[52] U.S. Cl. .................. 244/137.1; 244/118.1; 280/79.11; 414/397; 414/589
[58] Field of Search .................. 244/118.1, 137.1, 244/138 R; 280/79.7, 79.11; 414/397, 471, 589, 591

[56] References Cited

U.S. PATENT DOCUMENTS

| | | | |
|---|---|---|---|
| D. 340,340 | 10/1993 | Allen | 280/79.7 |
| 4,408,739 | 10/1983 | Buchsel | 414/347 |
| 4,725,183 | 2/1988 | Smillie, III | 414/541 |
| 4,907,935 | 3/1990 | Mankey | 244/137.1 |
| 5,074,496 | 12/1991 | Rezag et al. | 244/118.1 |
| 5,135,350 | 8/1992 | Eelman et al. | 414/347 |
| 5,163,806 | 11/1992 | Robertson et al. | 244/137.1 |
| 5,241,722 | 9/1993 | Rohrlick et al. | 244/137.1 |
| 5,378,105 | 1/1995 | Palko | 414/347 |
| 5,569,013 | 10/1996 | Evans et al. | 414/589 |

*Primary Examiner*—Andres Kashnikow
*Assistant Examiner*—Virna Lissi Mojica

[57] ABSTRACT

An airplane galley is moved through an airplane door and into final position on an airplane over honeycomb floor panels without damaging the panels or straining the workers by the use of a jacking dolly that is inserted into a meal cart slot under the galley. The dolly has a vertically extendable framework attached between an upper structure and a lower structure on casters. The upper structure is dimensioned to fit into at least one of the meal cart slots in the galley and can be jacked up to lift the galley off the floor. The casters supporting the lower structure of the dolly each include a low pressure pneumatic wheel that partially flattens and distribute the weight of the galley over a wide wheel footprint. The footprint of the partially flattened wheels has an area wide enough area to prevent damage to the honeycomb floor panels. The dolly is wheeled through the airplane door and into the final position on the airplane over the honeycomb floor panels and the jack is released to lower the galley directly onto the mounts in the airplane.

18 Claims, 10 Drawing Sheets

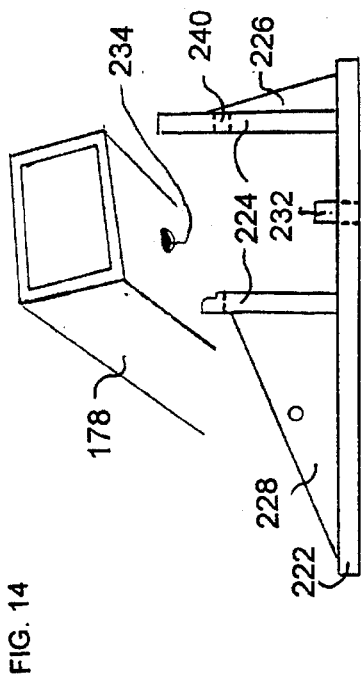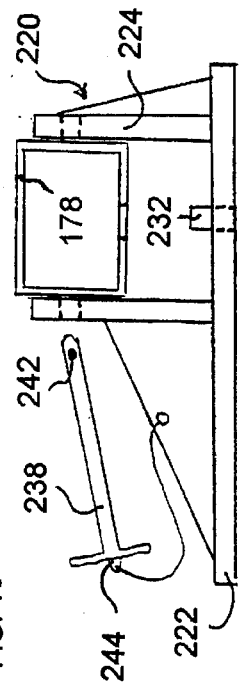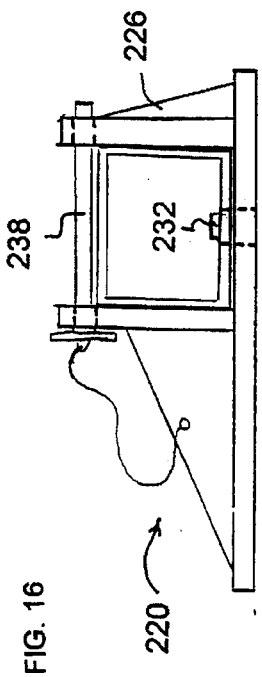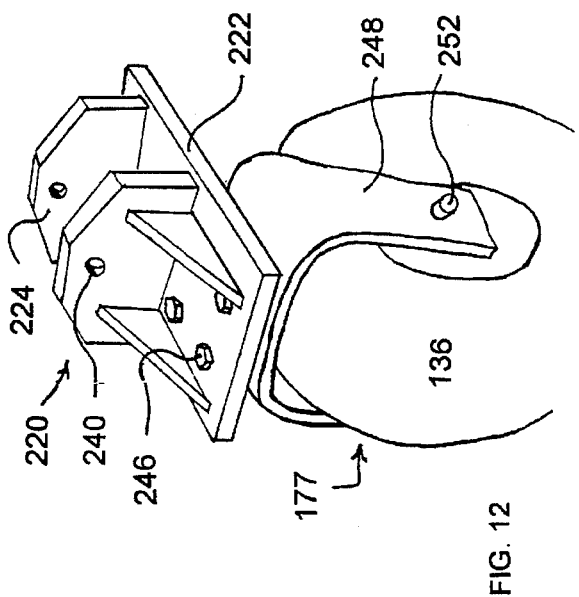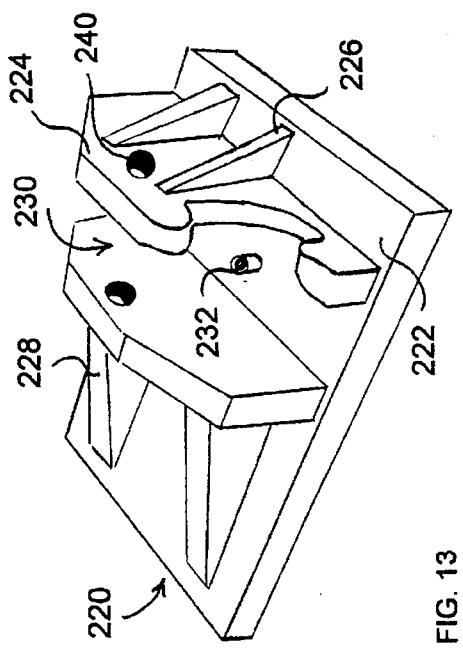

FIG. 17
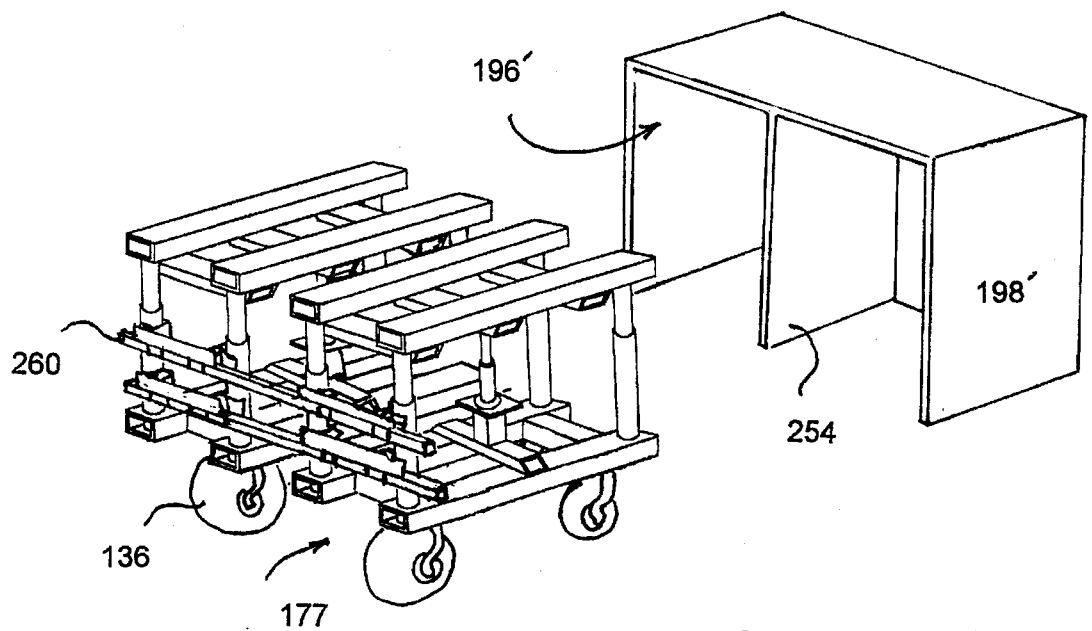
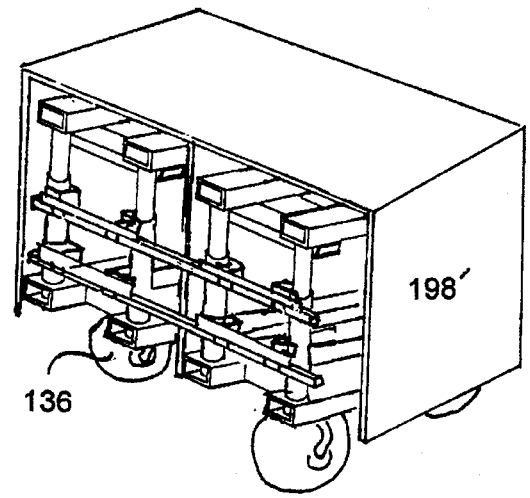
FIG. 18

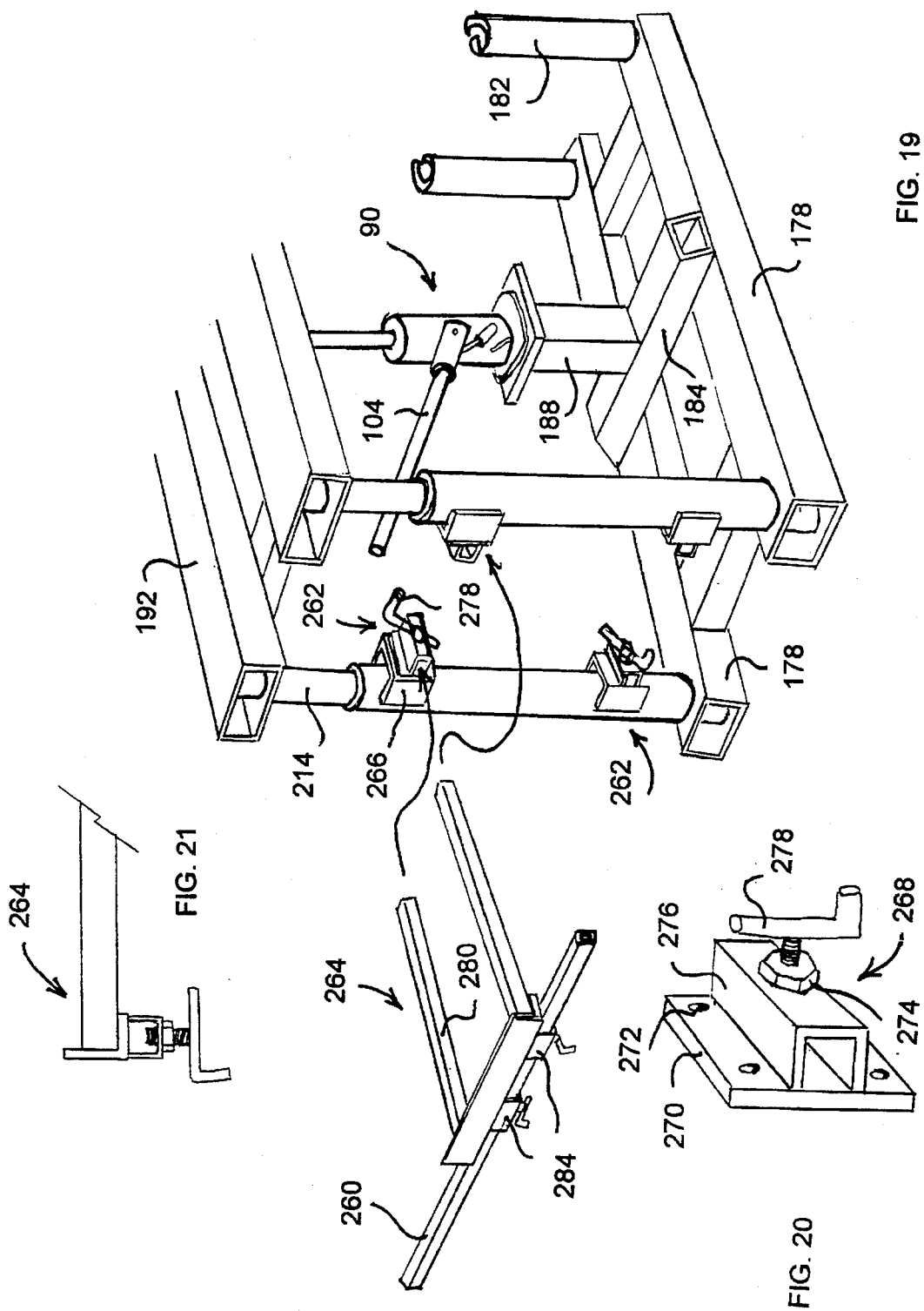

GALLEY DOLLY

This invention relates to a dolly for moving heavy loads safely over a fragile surface, and more particularly to a dolly for moving galleys, lavatories or other heavy and bulky unitized complexes onto an airplane over a honeycomb panel airplane floor during installation without strain to the workers and without damaging the floor panels.

BACKGROUND OF THE INVENTION

During the construction, maintenance and modification of commercial air transports, it is often necessary to move large unitized complexes such as galleys and lavatories, as well as seat sections, stow bins, and other components, onto or off of the airplane. These complexes are usually built by off-site vendors as complete units sized to fit through the door of the airplane, but only just barely. They are large and bulky, offering few convenient handholds for lifting and maneuvering, and they are often very heavy, on the order of 800 pounds. They must be moved onto the airplane over the airplane floor which is designed to be as lightweight as possible consistent with its load bearing requirements. Accordingly, virtually all airplane floors are made of honeycomb panels, usually two graphite/epoxy skins bonded to a Nomex or aluminum foil honeycomb core. These panels are very strong for their weight, but can be damaged easily by concentrated loads, such as a corner of a piece of equipment being dropped on the panel. The repair of such damage is very expensive and time consuming and could affect the delivery schedule of the airplane, so every possible precaution is taken to avoid such damage.

As a consequence of the size, weight and bulk of these unitized complexes, and the necessity to protect the airplane floor from excessive concentrated loads, the complexes are moved onto the airplane by hand, usually with a crew of 6–8 strong men. However, since there are few if any handholds on the complexes, suction cups are usually applied to whatever flat smooth surfaces are available to provide attachment points by which the crew can lift the complex and muscle it through the airplane door and onto a set of skid rails placed on the floor, along which it is dragged to adjacent its final position. The crew then lifts the complex off the skid rails and onto its hard points for attachment to the airplane.

Although this procedure has been used for many, many years, it is fraught with the possibilities of injury to the workers, damage to the airplane and the complexes themselves, and is very time consuming, labor intensive, and interrupts other important work in progress in the airplane at the same time that the complexes are being installed. Injury to the workers is perhaps the most serious. The awkward position of necessity assumed by the workers as they maneuver the heavy, bulky complex through the airplane door exposes them to significant risk of injury, especially back injury, and indeed the medical history of workers in this job supports that conclusion. Aside from the human cost, the financial cost of all such injuries to the airframe manufacturer, in terms of workman's compensation claims and retraining of replacement workers, is enormous and contributes a significant fraction to the cost of producing an airplane.

The suction cup method of attaching hand holds to the complexes, which is the only know practical method that does not involve drilling or other disfiguring alterations to the structure, itself occasionally causes damage by pulling the laminate off the sides of the complex. This becomes a cost to the airframer because the complex was delivered to them undamaged, and aside from the cost, interferes with the build schedule because the damage must be repaired in situ and sometimes must be repaired before the complex can be finally installed. Occasionally the complex is dropped or run into some other structure on the airplane, inevitably causing damage to the honeycomb floor or aircraft interior.

Thus, there has existed for many years a serious unfulfilled need for a method and apparatus for moving large complexes and other unitized structures and components into an airplane, during final assembly and outfitting, in a way that is simple, easy, fast and does not expose the workers to risks of injury or cause damage to the airplane or the complexes themselves.

SUMMARY OF THE INVENTION

Accordingly, it is an object of this invention to provide an improved method and apparatus for moving a galley through an airplane door and onto an airplane, over a honeycomb airplane floor, without subjecting workers to risk of injury or subjecting the airplane to risk of damage. Another object of this invention to provide an improved method and apparatus for moving heavy components of all kinds onto an airplane quickly, safely and without damage to the airplane floor or interior, and without risk of injury to the workers.

DESCRIPTION OF THE DRAWINGS

The invention and its many attendant objects and advantages will become better understood upon reading the description of the preferred embodiments in conjunction with the following drawings, wherein:

FIG. 12 is a perspective view of a castered wheel shown on the dolly in FIG. 7;

FIG. 13 is a perspective view of the bracket by which the castered wheel is mounted to the dolley in FIG. 7;

FIG. 14 is an end elevation of the bracket shown in FIG. 13 with a perspective view of a section of longitudinal tub to which the bracket is to be attached;

FIG. 15 is an end elevation of the bracket and tube shown in FIG. 14 in partially installed position;

FIG. 16 is an end elevation of the bracket and tube shown in FIG. 14 in fully installed position;

FIG. 17 is a perspective view of two coupled dolleys of the type shown in FIG. 7, positioned for insertion under a galley having a center divider;

FIG. 18 is a perspective view of the coupled dollies, shown in FIG. 17, jacked to lift the galley off the floor in preparation for moving;

FIG. 19 is a perspective view of a portion of one of the dollies shown in FIG. 17, with the bar connector assembly exploded out of the attachment assemblies for clarity of illustration;

FIG. 20 is a perspective view of one of the rod receptacles shown detached from the attachment assembly in FIG. 19; and FIG. 21 is side elevation of one end of the bar connector assembly shown exploded out of the attachment assemblies in FIG. 19.

DESCRIPTION OF THE PREFERRED EMBODIMENTS

Figure 1:
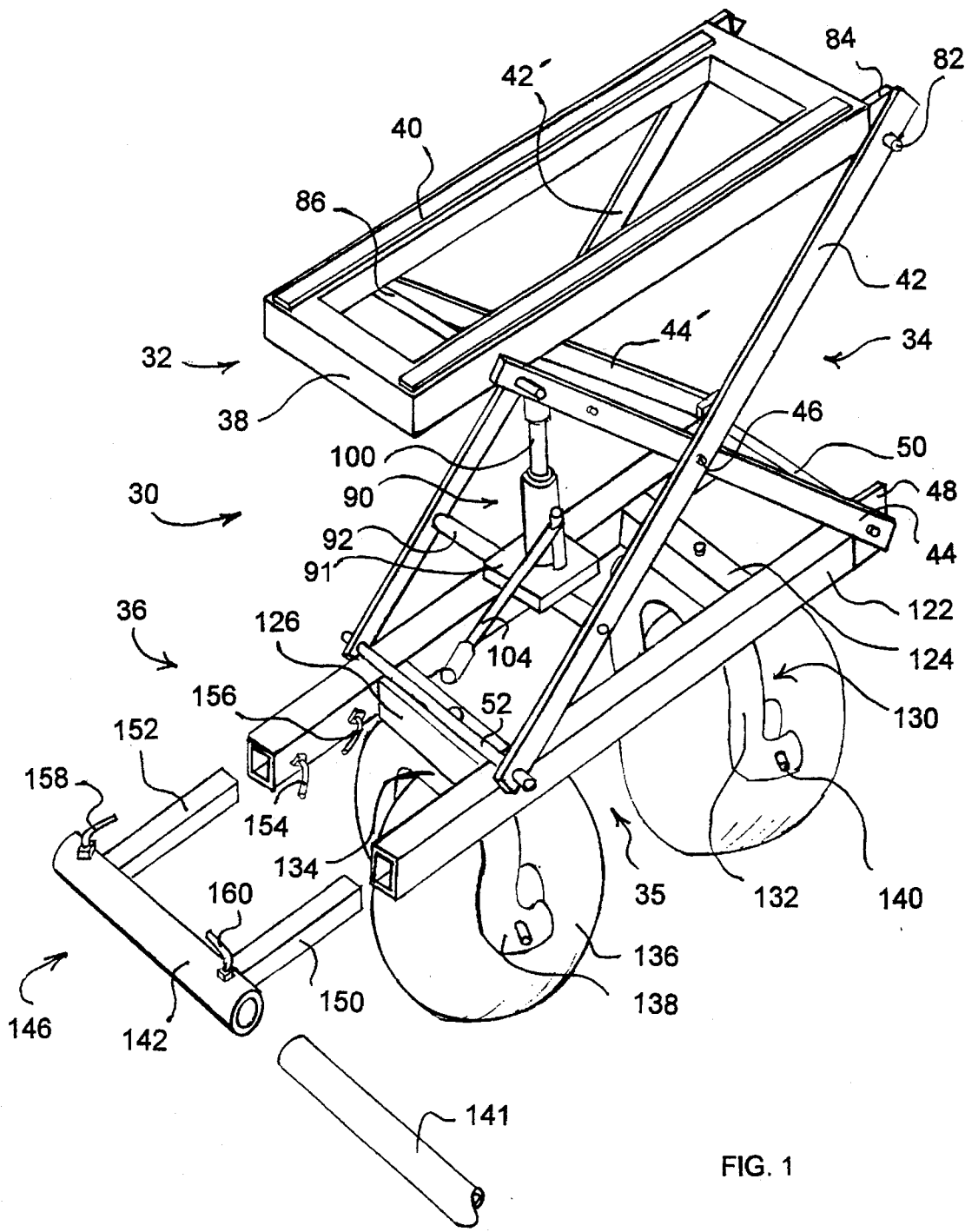
FIG. 1 is a perspective view of one embodiment of a galley dolly in accordance with this invention.
Figure 2:
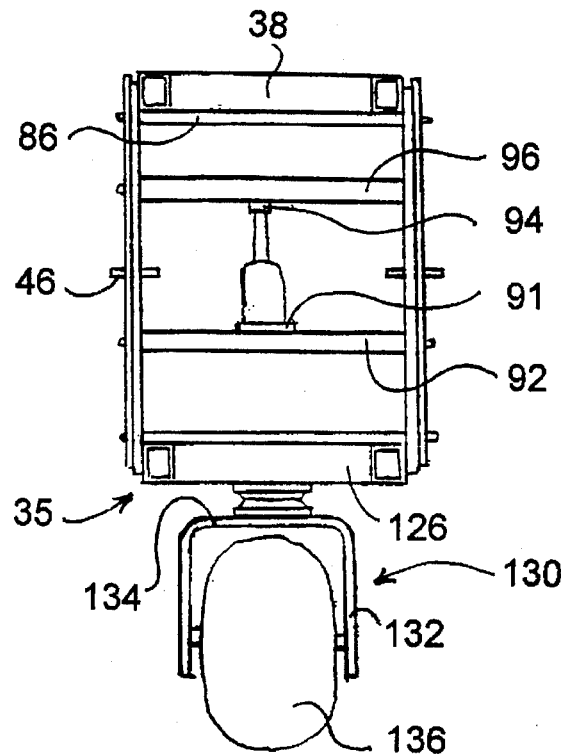
FIG. 2 is an end elevation view of the galley dolly shown in FIG. 1.
Figure 3:
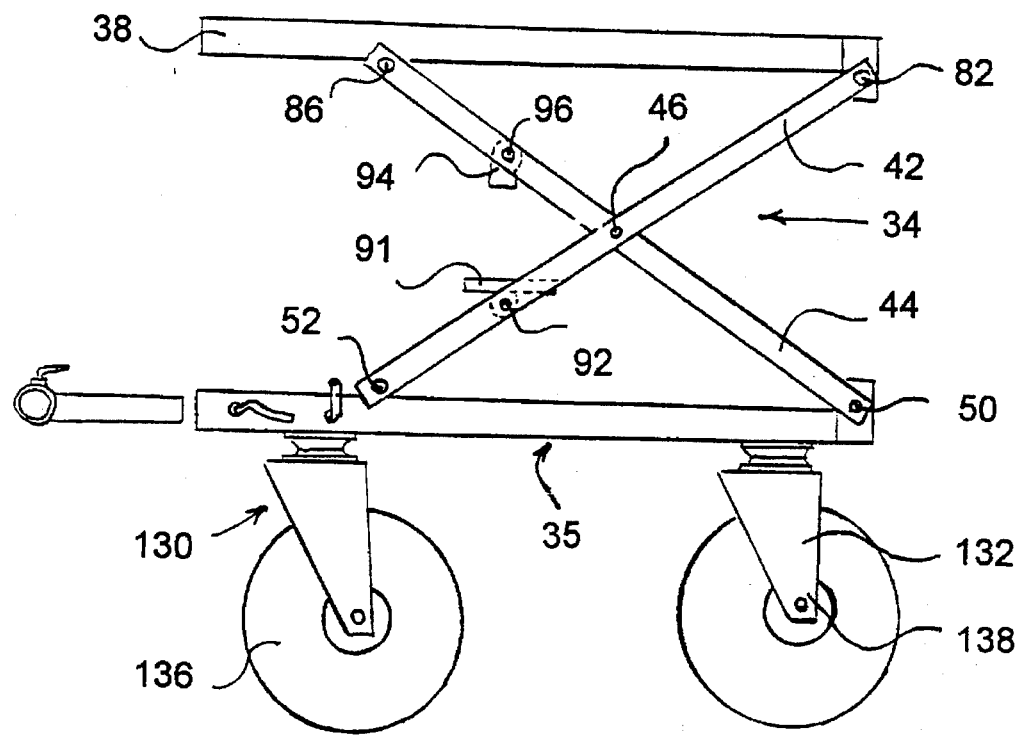
FIG. 3 is a side elevation view of the galley dolly shown in FIG. 1 with the jack removed for clarity.

Turning now to the drawings, wherein like reference characters designate identical or corresponding parts, and more particularly to FIGS. 1–3 thereof, a galley dolly 30 is shown having an upper structure 32 connected through a framework such as a folding scissors link 34 to a base 35 of a lower structure 36. The upper structure 32 is in the form of an open rectangular frame 38 which itself may function as a lifting pad, or may support one or more separate lifting pads 40 on the upper surface of the frame 38 as shown in FIG. 1. The lifting pads are preferably compliant, high friction material, such as an elastomeric foam like polyurethane or neoprene foam.

The scissors link framework 34 includes two rectangular arms 42 and 44 on one side of the framework, cross braced to a corresponding pair of arms 42' and 44' on the other side of the framework 34 and pivotally connected at the center with a pair of pivot pins 46. One pair of arms 44 and 44' is pinned at their lower ends to a pair of upright flanges 48 on the lower structure 36 by a pivot rod 50, and the lower ends of the other pair of arms 42 and 42' are connected by a connecting rod 52 that rolls on the lower structure 36.

Referring again to FIG. 1, the upper ends of the arms 42 and 42' are pinned by a pair of pins 82 to a pair of flanges 84 on the front end of the rectangular frame 38, which in turn rests at its rear portion on a support rod 86 connecting the upper ends of the arms 44 and 44'. For smoother operation and longer life, the frame 38 can be coupled to the support rod 86 by a pair of linear bearings (not shown) of known construction that are commercially available.

Figure 4:
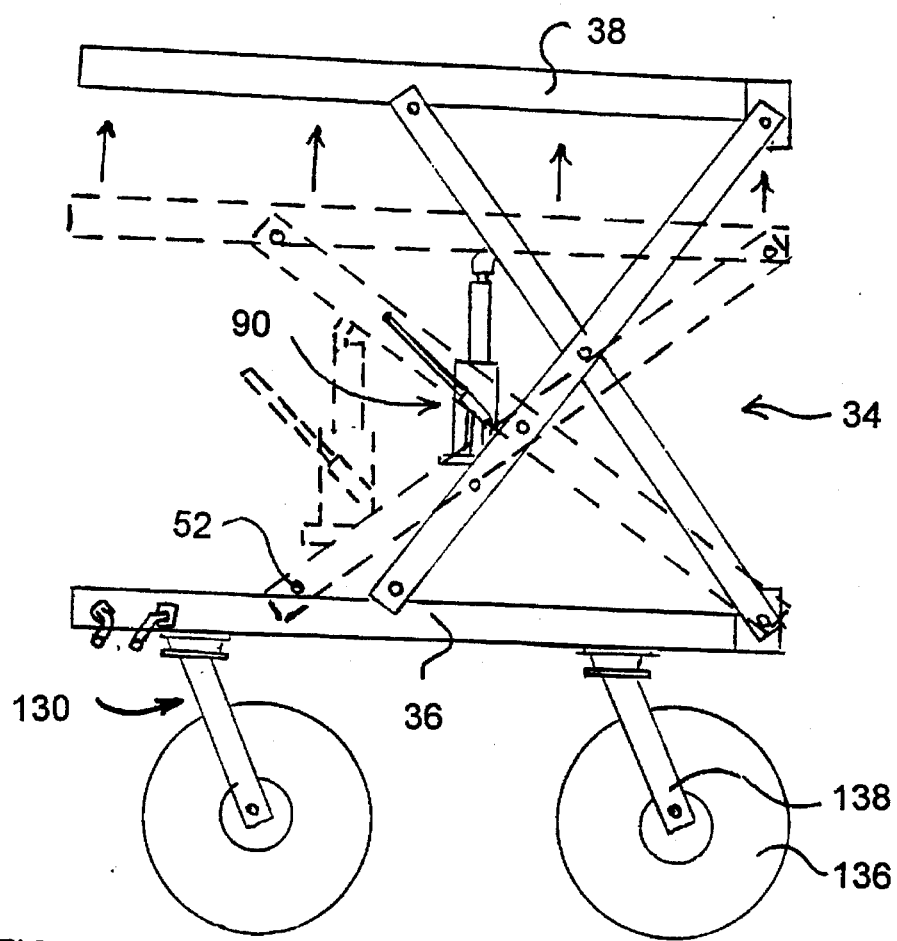
FIG. 4 is a side elevation of the galley dolly shown in FIG. 1, showning a phantom position before the dolly was jacked up to the raised position in solid lines.
Figure 5:
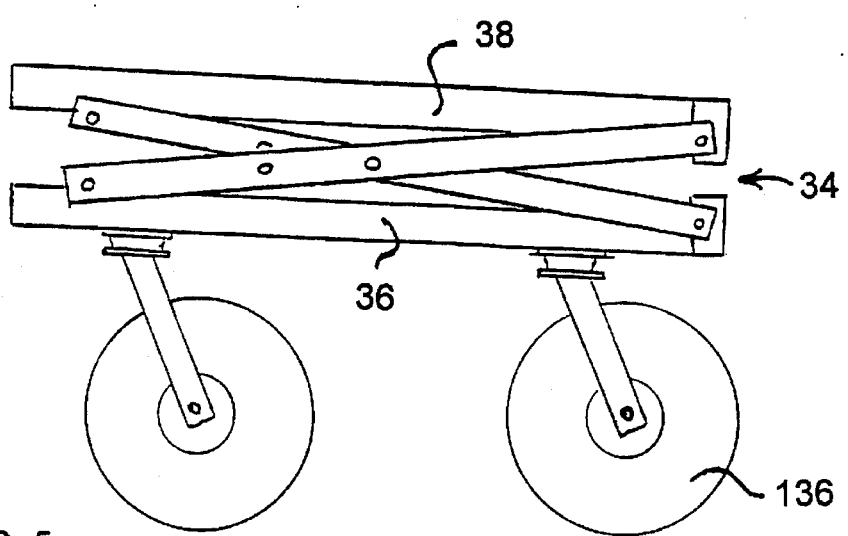
FIG. 5 is a side elevation of the galley dolly shown in FIG. 4 in fully folded position for storage.

A jack 90 is supported on a platform 91 welded to a cross brace 92 connecting the arms 42 and 42' below the pivot point 46, as shown in FIG. 2, and has an upper head engaged in a socket 94 welded to a cross brace 96 connecting the arms 44 and 44' above the pivot rod 46. When the jack 90 is extended, the framework 30 elongates vertically to raise the frame 38 as shown in FIG. 4, while the frame 38 remains parallel to the base 35. The jack can be removed to fold the framework 30 down flat for storage, as shown in FIG. 5.

The jack 90 illustrated is a conventional hydraulic jack having a work cylinder 98 holding a piston with a piston rod 100 to which the head is attached. A smaller diameter power cylinder 102 is coupled by internal hydraulic passages to the work cylinder 98. A piston in the power cylinder 102 is operated by a lever 104 operated by hand in the usual manner to pump hydraulic fluid from the power cylinder 102 into the work cylinder 98 and raise the piston rod 100 to extend the framework 30. A valve in the jack 90 operated by a control toggle connects the work cylinder 98 through an internal hydraulic passage to a hydraulic sump in the jack under the work cylinder 98 the allow the load on the frame 38 to push the piston 100 back into the cylinder 98 at a controlled rate.

Other forms of jack can be used instead of the hydraulic jack 90 to vertically extend the framework 30. Conventional ratchet jacks or other available devices that can be forcefully extended vertically can be used. For example, in facilities having air pressure supply lines, an air cylinder with a control valve may be used instead of the jack 90. In addition, an adjustment that extends the framework 34 into a position close to the lowered height of the galley when it is resting on the floor before the jack is operated would make the dolly usable for all height galleys with a jack having a short or moderate stroke.

Turning back to FIG. 1, the base 35 is in the form of a ladder frame having a pair of laterally spaced longitudinal members 122, made of rectangular cross-section tubing, connected in spaced parallel relationship by two cross struts 124 and 126 made of the same material, welded to the longitudinal members at about ¼ length positions from the ends of the longitudinal members 122, fore and aft. A front wheel yoke 130 is coupled to the front cross strut 124, and an identical aft wheel yoke 130 is coupled to the aft cross strut 126. The coupling is by way of a vertical pivot pin (not shown) which extends from the center of the wheel yokes 130 into a vertical journal bearing mounted in the struts 124 and 126. The yokes 130 each include a pair of vertical legs 132 connected at their top ends by a cross bar 134 to which the vertical pivot pin is attached for coupling to the journal bearing in the cross struts 124 and 126. The yokes 130 each straddle a wheel 136 and connect at off-set lower portions 138 of the legs 132 to the ends of wheel axles 140 on which the wheels 136 are journaled. The offset portions 138 of the legs 132 position the vertical centerline of the wheel 136 offset from the vertical axis of the vertical pin connecting the yoke to the cross strut. This offset creates a turning moment on the yoke 130 when the dolly is pushed in a particular direction, to align the vertical plane of the wheel with the direction of pushing so that the wheel 136 automatically points in the direction that the dolly 30 is being pushed.

The wheels 136 have low pneumatic pressure circular cross-section tires with heavy elastomeric walls of about uniform wall thickness. This construction enables the wheel to partially flatten under load to distribute the load uniformly over a wide area footprint. The wide area distribution of the load reduces the pressure on the supporting surface, such as a honeycomb panel airplane floor, to prevent damage to the floor panels that can be caused by concentrated loads. The low pressure also enables the wheel to roll easily over objects such as electrical cables, air lines, scrap fasteners, tools, and even the feet of workers without stopping the rolling of the wheel or putting excessive force on the object that could otherwise damage the object or drive it into the floor panel.

For the first time, it is now possible to use wheeled appliances to wheel heavy loads directly on the honeycomb floor panels of commercial transports without danger of damage to the floor panels, so the traditional hand carrying of heavy loads into an airplane is no longer necessary. Hereafter, heavy loads may be wheeled over the threshold frame member and through an airplane door into airplanes and across the honeycomb panel floor without damage to the airplane floor panels, without the usual injury to the workers, and without the need for the usual large crew of 6–8 workers or the usual disruptive interruption to the other installation work in progress at the time.

Figure 6:
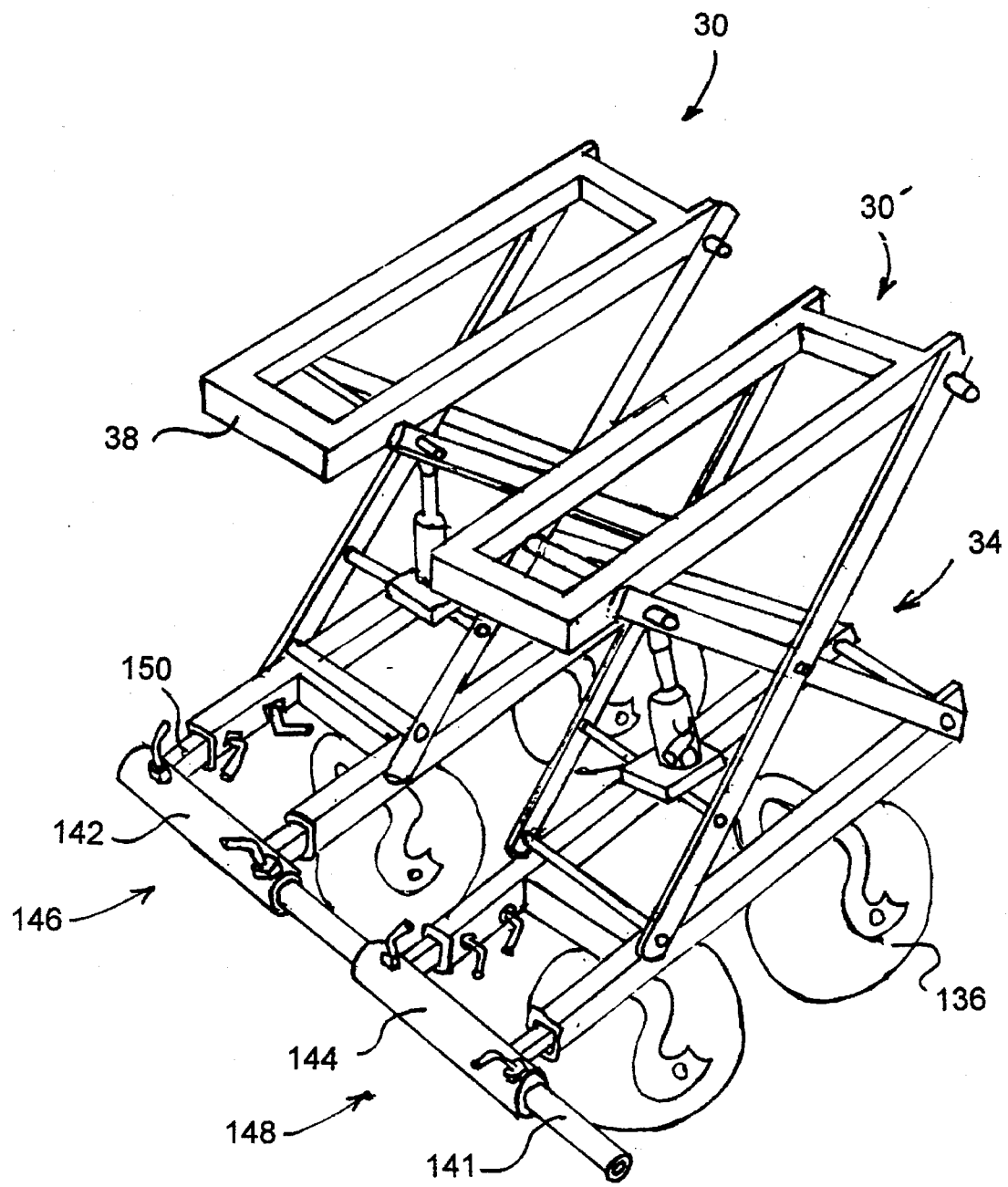
FIG. 6 is a perspective view of two galley dollies shown in FIG. 1 connected together to form a four wheel dolly.

Turning now to FIG. 6, an assembly of two coupled dollies 30 is shown by which a four wheel dolly is created for moving a galley onto an airplane and into final position in the airplane over the honeycomb panel floor. The dollies 30 are coupled at their aft ends by a coupling pipe 141 that telescopes into a cross pipe 142 and 144 of two end fittings 146 and 148 connected to the aft ends of two adjacent dollies 30 and 30'. The end fittings, each identical so the description of one will suffice for both, each includes a rectangular cross-section tube 150 and 152 dimensioned to slide into the open ends of the longitudinal members 122 of the base 35. The cross pipes 142 and 144 are welded or otherwise connected to the ends of the tubes 150 and 152. Two thumb screws 154 and 156 threaded into each of the longitudinal members 122 clamp the tubes 150 and 152 in place in the longitudinal members 122, and a similar set of thumb screws 158 and 160 clamp the coupling pipe 141 in the cross pipes 142 and 144 to connect the dollies 30 and 30' together to form a four wheel cart. A similar set of end fittings and coupling pipe may be provided at the front end of the dollies 30 and 30' if desired.

In operation, the dollies 30 and 30' are connected by the end fittings 146 and 148 as described, or are used separately. They are rolled under the galley to be moved, into the meal cart slots where the meal carts are stowed during airplane take-off and landing. The frame 38 of the upper structure 32 is dimensioned to fit into the slots so the lifting pads 40 are in position to be lifted into contact with a flat undersurface of the galley at the top of the meal cart slots. The jacks 90 is now operated to lift the galley off the floor. As the weight of the galley is taken by the dollies, the tires of the wheels 136 partially flatten to spread the load over a wide tire footprint, so the jacking stroke must be sufficient to accommodate the change in vertical elevation of the axles 140 above the floor between the unloaded and the loaded conditions of the dollies.

With the galley supported on the dollies 30 and 30', the galley may now be pushed or pulled, using the end fittings 146 and 148 as handles, on the dollies through the door of the airplane and into position inside the airplane fuselage over the hard points to which it is to be fastened. When in place, the jack is depressurized to lower the galley directly onto its mounts. It is never necessary for the galley to be lifted by hand with a crew of workers, much less maneuvered by the crew by hand. The elimination of unnecessary injuries to the workers and the saving of the avoided workman's compensation claims and lost time of skilled and valued workers more than compensates for the cost of the dolly, and the reduction in installation time as well as the elimination of the lengthy disruption to the work of other installation workers on the airplane while the galley is being moved into the airplane and into final position constitute additional savings to the airframe manufacturer.

Figure 7:
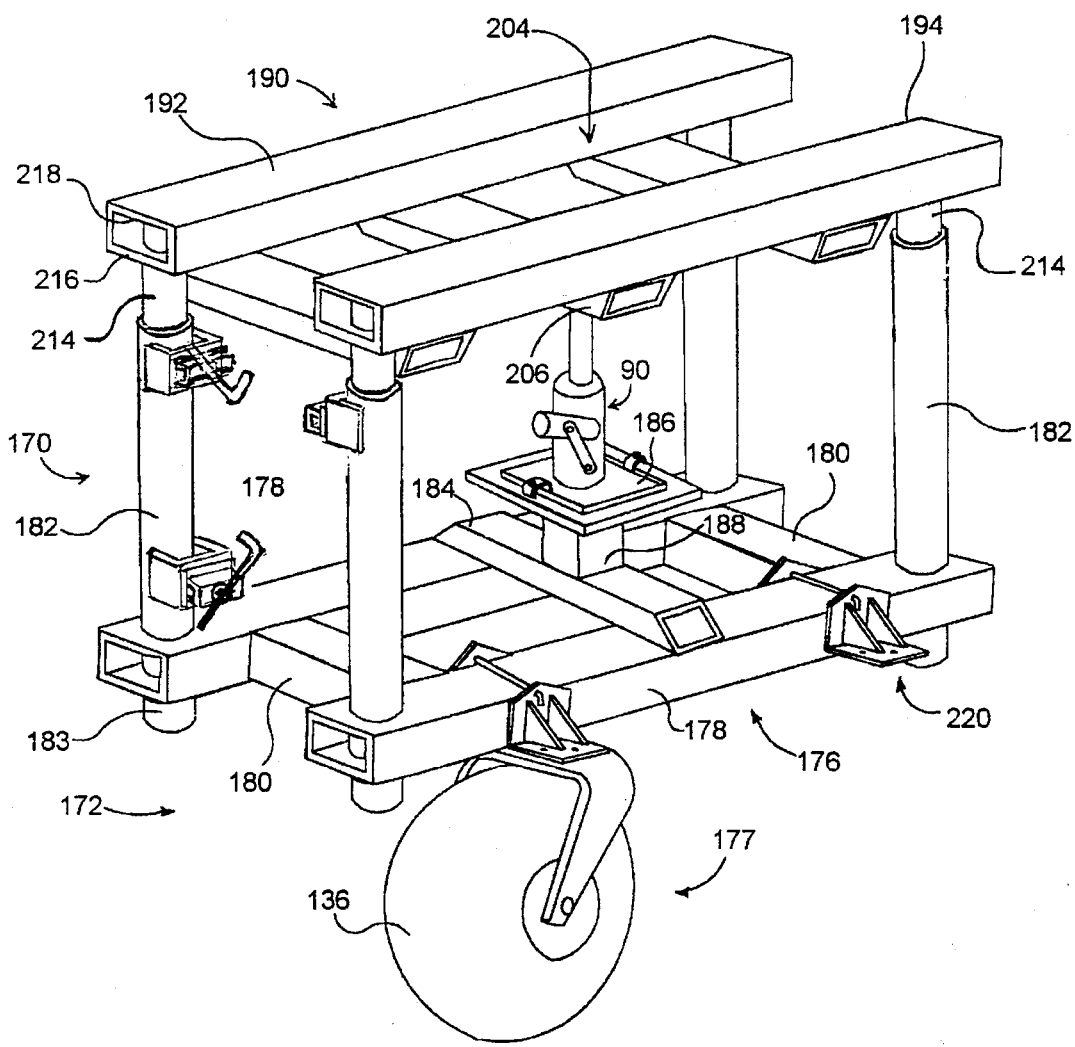
FIG. 7 is a perspective view of a second embodiment of a galley dolly according to this invention.

A second embodiment of the preferred embodiment, shown in FIG. 7 includes a vertically extendible framework 170 coupled between a lower structure 172 and an upper structure 174. The lower structure 172 includes a base 176 supported on four castered wheels 177, only one of which is shown in FIG. 7 for clarity of illustration. The base 176 has a pair of spaced parallel rectangular tubes 178 extending longitudinally, connected into a rigid ladder frame by a pair of cross members 180 welded at their ends to the tubes 178. Conveniently, the cross members 180 may also be rectangular tubes of the same cross-sectional dimensions as the longitudinal tubes 178.

The framework 170 includes four vertical guide sleeves 182, one at each corner of the base 176. The lower ends 183 of the guide sleeves 182 each extend through a hole in the end of each longitudinal tube 178 at each corner of the base 176 and are welded in place to the top and bottom walls of the tubes 178. A laterally extending support tube 184 is welded at its ends to the longitudinal tubes 178 about midway along their length and supports a jack platform 186 on a vertical column 188.

Figure 8:
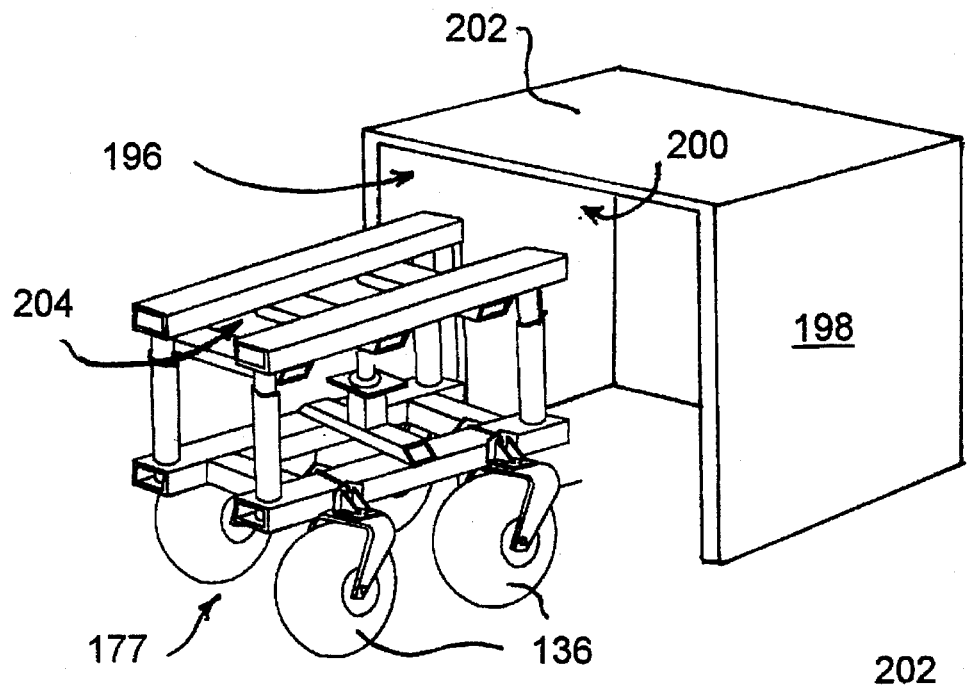
FIG. 8 is a perspective view of a gally dolly shown in FIG. 7 being rolled into a meal cart slot under a gally.
Figure 9:
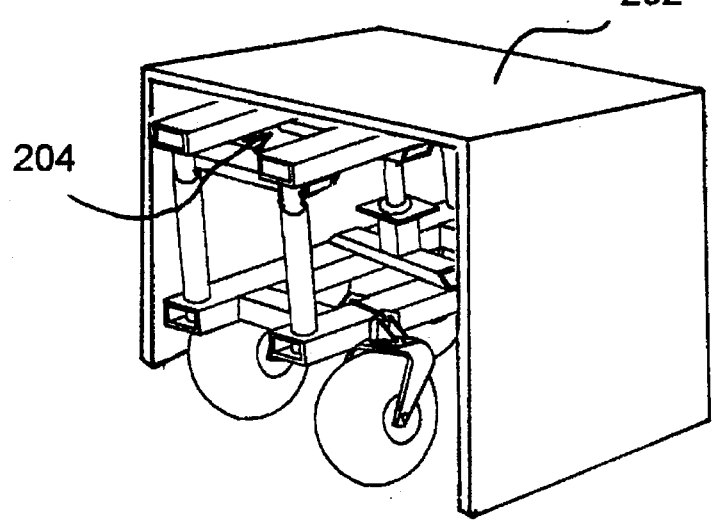
FIG. 9 is a perspective view of the galley dolly shown in FIG. 8 in place under a gally.
Figure 10:
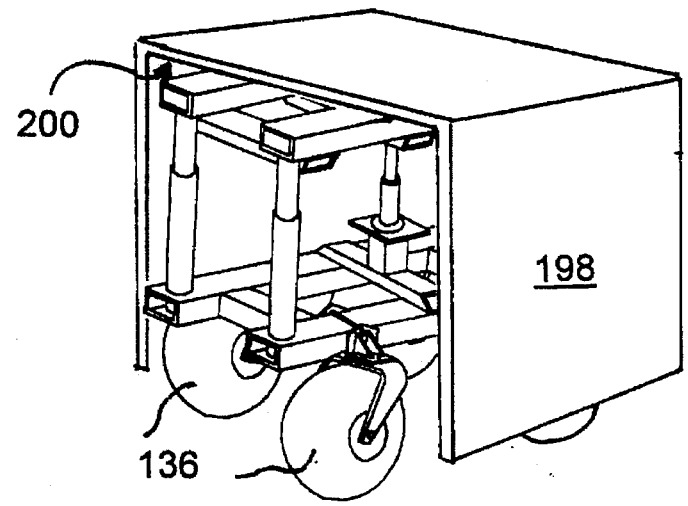
FIG. 10 is a perspective view of the galley dolly shown in FIG. 9 jacked up to lift the galley off the floor in preparation of movement of the galley on the dolly.

The upper structure 174 includes a jacking table 190 having two longitudinal lifting tubes 192, each topped with an elastomeric pad 194 (only one of which is shown in FIG. 7). The jacking table 190 is dimensioned to fit into a meal cart slot 196 of a galley 198, shown schematically in FIGS. 8–10, and engage the underside 200 of the galley counter 202 for lifting the galley 198 off the floor. The longitudinal gap 204 between the two parallel lifting tubes 192 accommodates a guide vane (not shown) provided on the underside 200 of some galley counters 202 between adjacent meal cart slots 196 to guide the insertion and removal of meal carts for meal service on the airplane.

Figure 11:
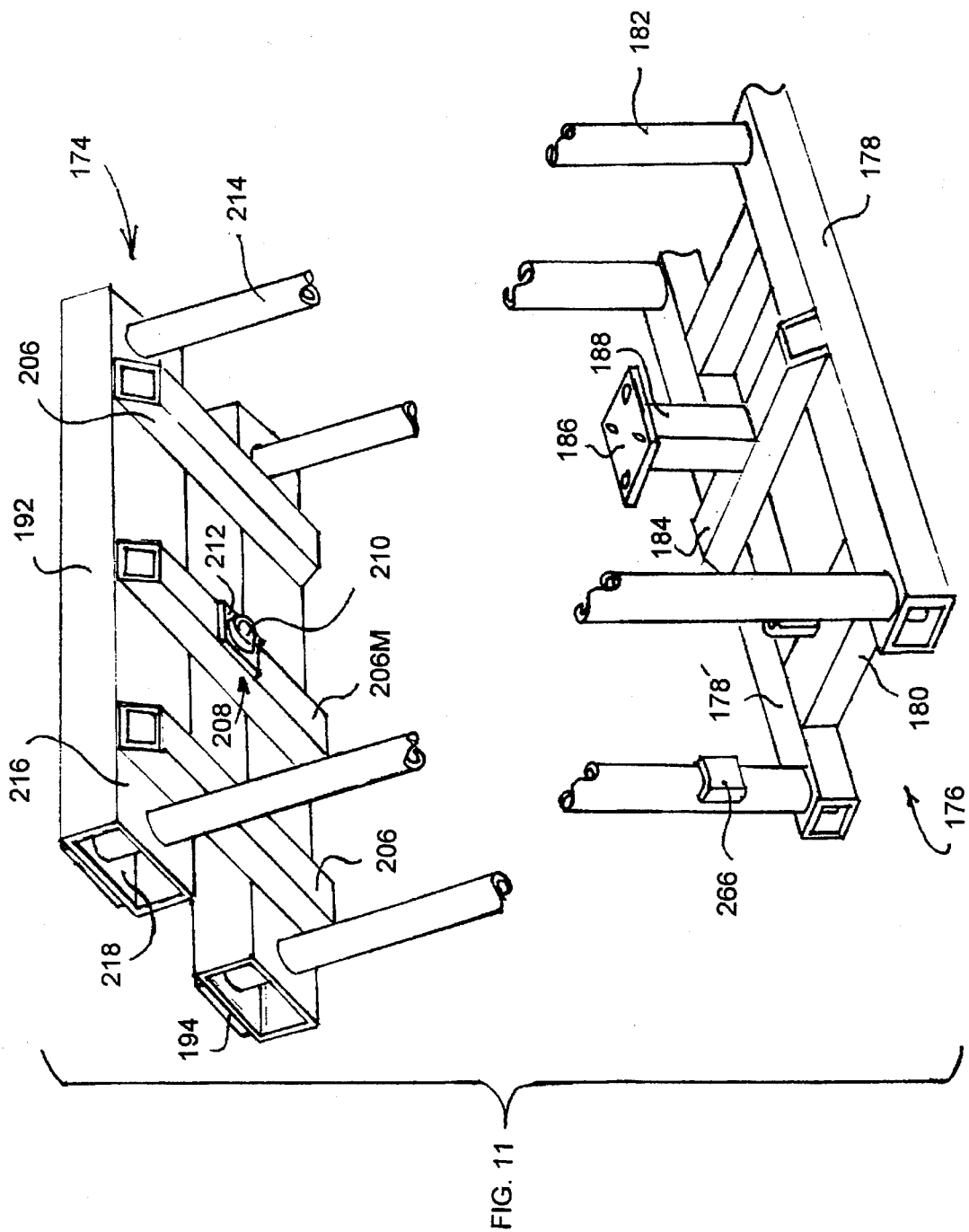
FIG. 11 is an exploded perspective view of the upper and lower structure of the galley shown in FIG. 7.

Three trayes 206, shown in FIGS. 7 and 11, are welded at their ends to the underside of the longitudinal lifting tubes 192, extending laterally across the gap 204 and securing the lifting tubes 192 in a rigid frame. The middle trave 206M is positioned approximately midway along the length of the lifting tubes 192 and has connected to its lower surface a socket 208. The socket is a short length of pipe 210 welded to a flat plate 212, in turn welded to the lower surface of the middle trave 206M midway along its length, so the socket is centered in the middle of the jacking table 190 and is vertically aligned over the jack platform 186.

A guide tube 214 depends from each corner of the jacking table 190. The guide tubes 214 each extend through a hole in the bottom wall 216 of the lifting tubes 192 and butt against the underside of their top wall 218, and are welded to both the top and bottom walls 216 and 218. The guide tubes 214 are dimensioned to fit with a sliding fit inside the guide sleeves 182 to provide a vertically telescoping framework between the lower structure 172 and the upper structure 174.

A jack 90, identical to the jack 90 in the embodiment of FIG. 1, is positioned on the platform 186 with the head of the jack piston rod engaged in the socket 208. In this way, operation of the jack 90 by the jack handle 104 lifts the jacking table 190 vertically, parallel to the base 176, guided by the guide tubes 214 sliding in the guide sleeves 182, into engagement with the underside 200 of the galley counter 202 in the meal cart slots 196 to lift the galley 198 off the floor so that it may be moved easily and precisely on the castered wheels 177.

Most galleys have about the same vertical height, so the galley dolly shown in FIGS. 7–10 will be usable as illustrated with most airplane galleys. However, in the event that a greater range of height adjustability is desired, the jack platform 186 may be provided with a series of vertical columns 188 of different heights, and the jack platform may be attached to the support tube 184 with a vertical bolt (not shown) extending through the support tube 184 and the vertical column 188 and threaded into the jack platform, or through the platform 186 and threaded into the base of the jack 90.

As shown in FIGS. 7 and 12–16, the castered wheels 177 are each connected to the base 176 by brackets 220 connected to the longitudinal tubes 178 adjacent to the inside edges of the cross members 180. The brackets each have a base plate 222 and two spaced upstanding face plates 224 welded to the base plate 222 and each braced by a pair of gussets 226 and 228 welded to the base plate 222 and the outside faces, that is, the faces opposite the inside opposed faces, of the face plates 224. The separation between the face plates 222 is selected to provide a snug fit of the longitudinal tubes 178 in the channel-shaped space 230 between the face plates 224 and the base plate 222. A roll pin 232 is set in a hole in the base plate in the center of the channel 230, shown in FIG. 13 through a broken-away section out of one of the face plates 224, and fits into a locating hole 234 in the underside of the longitudinal tubes 178, shown in FIG. 14. The engagement of the pin 232 in the hole 234 positions the bracket 220 correctly and also prevents the brackets from shifting inadvertently along the length of the longitudinal tubes 178 during use of the galley dolly.

As shown in FIGS. 15 and 16, a locking pin 238 is inserted through two holes 240 in the face plates 224 and extends across the top of the longitudinal tube members 178 to hold the brackets 220 on the tube members 178. The locking pins 238 can be of conventional design, such as those having a spring-loaded detent ball 242 at one end to hold the locking pin in the hole 240, released by a push button 244 at the other end for removing the locking pin from the holes 240. One centered locking pin 238 is shown in the top center of the two beveled face plates 224, but even more secure connection can be achieved by using two locking pins 238, one near each top corner of the face plates 224. In this two-pin arrangement, the face plates 224 would be made rectangular and not beveled as shown.

The castered wheels 177 are attached to the brackets 220 by bolts 246, shown in FIG. 12, which hold the top plate of a caster bearing (not shown) to the bracket base plate 222. The bottom plate of the caster bearing is attached to a caster fork 248 to which a wheel 136, identical to the wheels 136 in the embodiment of FIG. 1, is mounted by way of an axle 252 spanning the depending legs of the fork 248. The wheels 136 are available from Roleez Wheel Systems, Inc. in Norfolk, Va. The axle 252 is off-set from the vertical projection of the center of the caster bearing so that a lateral push on the bracket 220 generates a force couple that tends to rotate the fork 248 in the caster bearing and orient the wheel 136 with the line of action of the push. The galley, supported on the galley dolly of this invention, may thus be pushed in any desired direction and the wheels 136 will all rotate and align with the desired direction so the galley 198 can easily be maneuvered through the doorway of the airplane and to its designated location in the interior without effort and without damage to the airplane interior, the airplane floor panels, or the galley 198 itself.

There may be occasions in which it may be convenient or necessary to use two galley dollies to move a galley. For example, if the galley is large and exceeds the load capacity of the dolly, or if it is long and a dolly at each end would make it more maneuverable. A more common circumstance is shown in FIGS. 17 and 18, wherein a center divider 254 between adjacent meal cart slots in a galley, illustrated schematically at 198', prevents the dolly from being centered under the center of mass of the galley 198'. Movement of the galley with one off-center dolly would be possible, and in fact would be preferable to the present man-powered technique described above. However, the use of two coupled dollies, as shown in FIG. 17 and 18, facilitates the movement of a galley of the type with a center divider 254.

The dollies may be coupled together with a coupling bar 260 using the coupling structure, shown in FIGS. 19–21, which includes an attachment assembly 262 fastened to the guide sleeves 182, and a bar connector assembly 264 for connecting the coupling bars 260 to the attachment assemblies 262. Two vertically spaced attachment assemblies 262 are connected to each guide sleeve 182, as shown in FIG. 19, and each include a vertically oriented channel section 266 having two legs and a connection web. The channel section 266 is welded at the ends of its legs to the guide sleeve and presents the web as a vertical, laterally facing structure for attachment of a rod receptacle 268, shown in FIG. 20. A rectangular mounting plate 270 of the rod receptacle 268 has a hole 272 drilled at each corner for receiving a screw which is threaded into a tapped hole in each corner of the web of the channel section 266, by which the rod receptacle 268 is fastened to the channel section 266. A nut 274 is welded over a hole in the web of a smaller, horizontally oriented channel section 276 that is welded to the mounting plate 270. A threaded rod, threaded into the nut 274, has an attached spin handle 278 for tightening the threaded rod in the nut 274 against a rod 280 of the bar connector assembly, extending horizontally through the channel section 276, to hold the rod 280 in whatever position is desired.

The bar connector assembly 264 has an angle section 282 welded to the ends of two rods 280 spaced apart along the angle section 282 a distance equal to the space between the horizontal channel sections 276 on opposed attachment assemblies 262 on laterally opposed guide sleeves 182. A pair of channel sections 284, each having a nut and spin handle, like that on the attachment assembly 262, is welded on the bottom face of the angle section 264 for receiving and holding the coupling bar 260. The coupling bar extends laterally across from one dolly through the channel sections 284 on the bar connector assembly 264 on the dolly in the adjacent meal cart slot in the galley to connect the two dollies in a spaced array.

The same attachment assemblies and bar connector assemblies can be used to brace the inner end of the dollies inside the meal cart slots 196'. A telescoping bar can be fixed in the inner end bar connector assembly instead of the long coupling bar 260, and that bar connector assembly is mounted in the lower pair of attachment assemblies 262. The length of the telescoping bar is adjusted to just fit inside the meal cart slot 196', and it is locked to that adjusted length. Suitable padding is provided on the ends of the telescoping bar, such as cane tip caps or the like. The telescoping bar transfers the push on the galley directly to the lower inner end of the galley so the wheels readily self-align to the direction of the push, as explained above.

In operation, when it is desired to move a galley, a galley dolly is rolled into the meal cart slot under the center of mass of the galley and the jack 90 is jacked using the jack handle 104 to lift the jacking table 190 upward against the underside of the galley counter and lift the galley off the floor, balanced on the dolly. The pads 194 on the top of the lifting tubes 192 protect the undersurface of the galley counter from scratches and also prevent it from sliding on the lifting tubes 192.

The galley, now supported on the wheels of the dolley, can be easily rolled through the doorway of an airplane by several workers, without strain and without risk of damage to the airplane interiors, the airplane honeycomb floor panels, or the galley itself. The low pressure wheels 136 partially flatten to distribute the weight of the galley over a wide footprint and thus avoid concentrating the load in a small area as occurs with small hard wheels or high pressure tires. The wheels 136 also roll easily over obstructions such as electrical cables, air hoses, tools and loose fasteners which are occasionally present during final installation of airplane interiors.

The galley is rolled into the position where it is to be located and is adjusted exactly over the fasteners on the hard points to which it is to be fastened. The valve on the jack is turned using the jack handle 104 to slowly lower the galley onto the fasteners, making whatever fine adjustments to the position of the galley are necessary to mate the fasteners with the attachment holes in the galley legs. The jack is then lowered completely and the dolley is rolled out of the meal cart slots. The entire operation is performed quickly, effortlessly, and free of injury to the workers or damage to the galley or the airplane.

Obviously, numerous modifications and variations of the described preferred embodiments will occur to those skilled in the art in light of this disclosure. Accordingly, it is expressly to be understood that the use of these modifications and variations, and the equivalents thereof, are to be considered to be within the spirit and scope of the invention as defined in the following claims, wherein

I claim:

1. A process for moving an airplane galley through an airplane door and over honeycomb floor panels into final position on an airplane, comprising:

inserting at least one jacking dolly into a meal cart slot under said galley;

jacking said galley off the floor and supporting said galley on said dolly on a set of low pressure pneumatic wheels that partially flatten and distribute the weight of said galley over a wide wheel footprint;

wheeling said galley on said set of wheels through said airplane door and into said final position on said airplane over said honeycomb floor panels while distributing said weight of said galley over said footprint of said partially flattened wheels having an wide enough to prevent damaging said honeycomb floor panels.

2. A process as defined in claim 1, wherein said jacking step includes:

supporting a jack on said dolly in a position to bring a lifting table on said dolly into engagement with an underside surface of said galley in said meal cart slot;

elevating said lifting table by operating said jack to engage said underside surface of said galley in said meal cart slot with said lifting table, lift said galley off the floor, and transfer the weight of said galley onto said dolly.

3. A process as defined in claim 2, further comprising:

steering said galley into final position in said airplane by rotating at least one of said wheels about a vertical axis to orient said wheel so it will roll in the desired direction, and pushing said galley, supported on said wheels, in said desired direction.

4. A process as defined in claim 2, further comprising:

vertically expanding a framework of said dolly to increase the total vertical height of said dolly to about the vertical height of said meal cart slot before operating said jack;

whereby said jack has a stroke long enough to accommodate the difference in height of said wheels between said partially flattened load bearing condition and the unflattened unloaded condition thereof.

5. A process as defined in claim 2, further comprising:

positioning said galley at a desired position in said airplane directly over hard points to which said galley is to be attached; and lowering said galley on said dolley directly onto said hard points by operating said jack to lower said lifting pad.

6. A process as defined in claim 5, wherein:

said lowering step includes operating a hydraulic valve on a hydraulic jack to allow fluid to flow out of a work cylinder and allow the weight of said galley to push a piston in said jack down into said work cylinder.

7. A process as defined in claim 2, further comprising:

engaging a compliant, high friction pad on said lifting table with said undersurface of said galley and thereby resist sliding movement of said galley on said lifting table.

8. A process as defined in claim 2, further comprising:

coupling two dollies together at one end thereof to enable said dollies to support said galley, balanced on said dollies, when said galley has a center divider in said meal cart slots.

9. A process as defined in claim 8, further comprising:

engaging inner walls of said galley interior of said meal cart slots with structure on an end opposite said one end of said dollies, whereby pushing on said galley translates directly to said wheel on said opposite end of said galley.

10. A method for moving a galley through a door of an airplane and into final position in said airplane over a floor made of honeycomb floor panels, said galley having a counter and an opening under said counter for receiving meal carts, comprising:

selecting a dolly having an upper structure dimensioned to fit into at least one of said meal cart slots, said dolly having a lower structure engaging and supported on at least two axles oriented horizontally, and a framework intermediate said upper structure and said lower structure for supporting said upper structure on said lower structure;

supporting said dolly on at least one low-pressure pneumatic wheel on each of said axles, said wheels each having a thick round flexible elastomeric wall for partially flattening under load and distributing said load uniformly over a large area footprint on said honeycomb floor panels;

raising a lifting table on said upper structure into engagement with an underside surface on said galley in said meal cart slots with a jack on said framework, and lifting said galley above said floor panels and supporting said galley on said wheels.

11. A galley moving method as defined in claim 10, wherein:

rotating at least two yokes connected to said framework bearings about vertical axes on which said yokes swivel to orient said wheels on vertical planes intersecting the desired location of said galley, said yokes each having two depending legs on which said axles are mounted and between which said axles extend;

pushing and rolling said dolly on said wheels over said honeycomb floor panels to the desired location of said galley in said airplane without exceeding the load limit of said honeycomb panels.

12. A galley moving method as defined in claim 11, further comprising:

raising said dolly on a set of telescoping legs coupled between said lower structure and said upper structure of said framework while maintaining said upper structure parallel to said lower structure.

13. A galley moving method as defined in claim 12, further comprising:

coupling together said upper structure and said lower structure while permitting vertical movement therebetween and maintaining said structures in vertical alignment by receiving guide tubes of said telescoping legs on said upper structure telescopically within guide sleeves of said telescoping legs on said lower structure.

14. A galley moving apparatus as defined in claim 11, wherein:

expanding said framework and pressing said lifting pad into contact with said underside surface with a hydraulic jack having a stroke of sufficient length, and capable of exerting sufficient force, to lift said galley off the floor.

15. A galley moving method as defined in claim 14, further comprising:

supporting said jack on a jack platform mounted on said lower structure; and receiving and engaging a head of said jack in a socket mounted on said upper structure.

16. A galley moving method as defined in claim 11, further comprising:

engaging said undersurface of said galley with a compliant, high friction pad on said lifting table to resist sliding movement of said galley on said lifting table.

17. A galley moving method as defined in claim 16, wherein:

said coupling includes attaching a coupling bar and a bar connector to said one end of said dollies, and attaching an attachment assembly for said bar connector to said dollies.

18. A galley moving method as defined in claim 11, further comprising:

coupling at least one end of two dollies together.

* * * * *